Figure 1:
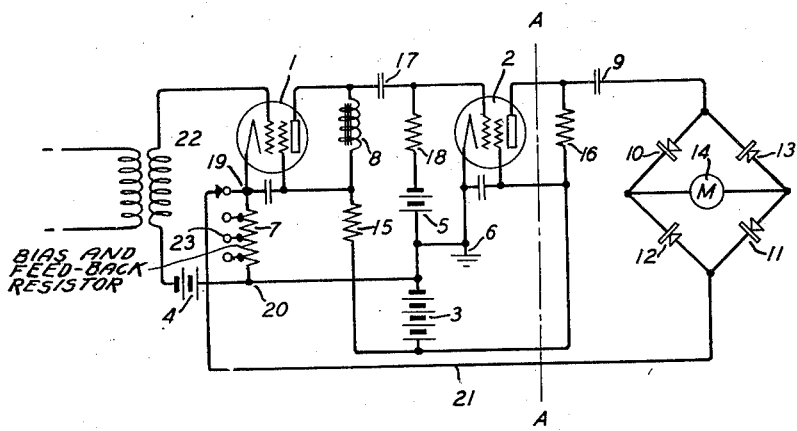

Feb. 21, 1939.  A. V. WURMSER  2,147,729

ELECTRIC METERING DEVICE

Filed March 16, 1937

INVENTOR
A. V. WURMSER
BY
ATTORNEY

Patented Feb. 21, 1939

2,147,729

UNITED STATES PATENT OFFICE 2,147,729

ELECTRIC METERING DEVICE

Alphons V. Wurmser, Teaneck, N. J., assignor to Bell Telephone Laboratories, Incorporated, New York, N. Y., a corporation of New York Application March 16, 1937, Serial No. 131,190

12 Claims. (Cl. 171—95)

This invention relates to electric metering apparatus and more particularly to vacuum tube meters utilizing one-way electrical devices for rectifying the vacuum tube output currents before such currents are applied to a metering arrangement.

In metering apparatus of the type indicated, it has been found that there are variations in the readings of the apparatus which have heretofore precluded their use where extreme accuracy is desired. Such variations are due to the change of impedance of the one-way devices under varying atmospheric conditions, primarily changes in temperature and humidity. Changes in other circuit elements also have detrimental effects. It has, therefore, been necessary to calibrate the apparatus at frequent intervals and in the case of one-way devices, to enclose them in a container where the atmospheric conditions are maintained approximately constant. In either case, considerable expense is involved to maintain the apparatus constant and accurate.

The present invention has as its main object an improved electric metering apparatus.

Another object of the invention is a simple inexpensive accurate meter for electric currents.

A further object is an electric meter which is automatically adjusted to give accurate indications under varying atmospheric and electrical conditions.

These objects are attained in accordance with this invention by providing amplification ahead of the meter and feeding back, in the amplifier, waves from the meter in such manner as to reduce the gain of the circuit.

The invention and its mode of operation will be better understood from the following description and attached drawing forming a part thereof.

Referring to the drawing,

Fig. 1 shows a complete circuit, and

Figure 2:
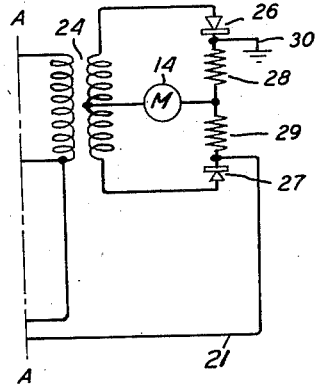

Fig. 2 a detail modification.

Fig. 1 discloses a vacuum tube metering apparatus comprising two resistance-capacity coupled space discharge devices 1 and 2. Device 1 is transformer-coupled to the source or line from which the currents to be measured are obtained.

The cathodes of devices 1 and 2 may be heated in any desired manner and no particular arrangement is shown in the drawing. Anode and screen grid potentials are derived from source 3 in a manner well-known in the art. Sources 4 and 5 impress the desired grid bias potentials on the control grids of devices 1 and 2, respectively.

The cathode of device 2 is directly connected to ground at 6 while the cathode of device 1 is connected to ground through resistance 7.

Retardation coil 8 presents a high impedance to the alternating current output of device 1 while condenser 9 which has a capacity of approximately 2 millifarads presents a path of low impedance to the alternating current output of device 2.

Included in the output circuit of device 2 is a Wheatstone bridge arrangement of one-way devices 10, 11, 12 and 13 with a milliameter or other measuring device 14 connected in one diagonal of the bridge. Preferably, the one-way devices are the so-called copper oxide rectifiers but the invention is not limited to them and any corresponding one-way devices may be used.

The anode current path of device 1 for direct current may be traced from the positive terminal of grounded source 3 through resistance 15, retardation coil 8, the anode and cathode of device 1, resistance 7 to the grounded terminal of the source. The corresponding path for device 2 may be traced from the positive terminal of source 3 through resistance 16, the anode and cathode of device 2 to the grounded terminal of the source.

It will be noted that resistance 7 is included in the direct current anode path and also the input circuit of device 1 and, therefore, cooperates with source 4 in establishing the grid bias for device 1 and for stabilizing this device.

The alternating current output path of device 1 includes the cathode and anode, condenser 17, resistance 18, source 5 and resistance 7. The alternating current output path for device 2 includes the cathode and anode, condenser 9, the bridge of one-way devices 10, 11, 12, 13, conductor 21 and resistance 7. It is to be noted that resistance 7 is included in the output circuits of both devices 1 and 2. It is further to be noted that whereas the alternating current cathode return path of device 2 is connected through resistance 7 from conductor 21, the alternating current cathode return for device 1 is connected through resistance 7 from junction 20.

With the type of interstage coupling shown, the outputs of devices 1 and 2 are 180 degrees out of phase. Therefore, if at any instant junction point 19 be taken as positive with reference to point 20 due to the output of device 2, junction point 20 will be negative with reference to point 19 due to the output of device 1. That is, the circuit connections are such that although the outputs of devices 1 and 2 are out of phase 180 degrees with reference to each other they are applied to resistance 7 in phase.

In each case, the effect of the feedback through resistance 7 is to reduce the gain of device 1. A more complete disclosure of the advantageous action of negative feedback in amplifiers is given in an article by Mr. H. S. Black in Electrical Engineering for January 1934, vol. 53, pages 114 to 120.

Assume a signal of constant amplitude impressed upon the input of device 1 through the input transformer. As long as the characteristics of devices 1 and 2, associated circuits and sources of current remain fixed, meter 14 will read the values in accordance with its calibration. If due to atmospheric or other changes the impedance of devices 10 to 13 of the output bridge changes, the feedback impressed upon resistance 7 and hence upon device 1 will also change. If the impedance of the bridge is reduced, the amount of feedback is increased and the gain of device 1 is decreased proportionately thereby maintaining the reading of the meter 14 constant. In the event of an increase in the impedance of the bridge, the feedback is decreased, the gain increased proportionately and the meter maintained constant.

This same result is brought about in the event of a change in impedance of any of the apparatus in the circuit or if there is a change of potential of any of the current sources.

With varying input the meter reading will vary accordingly and hence give the correct reading because the negative feedback tends to make the transmission characteristic of the circuit both stable and linear despite inherent non-linearity and instability in the system.

Resistance 7 is shown provided with taps 22 and 23 such that the feedback lead 21 can be brought back to include in the feedback path from the bridge all or a definite part of resistance 7. This provides a simple and effective sensitivity adjustment. With the feedback connection made at tap 22 the gain reduction may for example be 40 decibels while tap 23 may give 20 decibels gain reduction. Other taps as shown, giving other amounts of feedback can be provided. Resistance pads in the input are dispensed with by this simple type of circuit.

Fig. 2 shows an output circuit that may replace that portion of the circuit of Fig. 1 to the right of the broken line A—A. Fig. 2 employs output transformer 24 with center-tapped secondary, and two copper oxide rectifiers or one-way devices 26, 27, in place of the four used in Fig. 1. Two resistances 28, 29 complete the circuit. A connection 30 extends to the cathode terminal (ground) in order to complete the feedback path.

In the circuit of Fig. 2 waves of one polarity flow through the upper half of the output secondary winding, one-way device 26, resistance 28 and meter 14. The potential drop developed across resistance 28 is fed back in series with resistance 29. Waves of opposite polarity flow through the lower half of the output secondary winding, one-way device 27, resistance 29 and meter 14, and produce a voltage in the feedback path from across resistance 29 in series with resistance 28. Otherwise the operation of the circuit is as described with reference to Fig. 1.

Whereas the invention has been disclosed in connection with specific circuit arrangements, many variations may be made as to circuits and apparatus without departing from the invention, and hence the invention is to be considered as limited only by the scope of the appended claims and the teachings of the prior art.

What is claimed is:

1. An alternating current metering device comprising a space discharge device having an input circuit and an output circuit, a second discharge device having an input circuit and an output circuit, an electric meter in the output circuit of the second of said devices, and means coupling said meter to the first space discharge device for impressing the alternating current output of said second space discharge device on the input of said first space discharge device in such a manner as to reduce the gain of said first space discharge device.

2. An electric current metering device comprising a space discharge device having an input circuit and an output circuit, a resistance common to said circuits, another space discharge device having an input circuit and an output circuit, the output circuit of said first device being coupled to the input circuit of said second device, a bridge arrangement of rectifiers in the output circuit of the second of said devices, an electric meter connected across one diagonal of said bridge, and a connection from said bridge completing said output circuit to said resistance.

3. A metering system comprising an amplifier having an output transformer with a center-tapped secondary, a center-tapped resistance connected to the outer terminals of said secondary with a one-way device included between each outer terminal of the winding and a terminal of the resistance and poled to transmit opposite half-waves, a meter connected between the two center-taps, and a feedback circuit from across said resistance to a point in the amplifier and poled to reduce the gain of the amplifier.

4. An electric metering system comprising an amplifier having an input and an output circuit, a meter in the output circuit of said amplifier, and means coupling the output circuit to the input circuit of said amplifier for feeding back alternating current to the input circuit.

5. An electric metering system comprising an amplifier having an input and an output circuit, a meter in the output circuit, and means coupling said meter to said input circuit for feeding back alternating current from the output circuit to reduce the gain of said amplifier.

6. A current metering device comprising a space discharge device having a cathode, an anode and a control grid, a resistance common to the grid and anode circuits of said device for applying biasing potential to said grid when current flows in the anode circuit, a second discharge device coupled to said first device, an electric meter in the output circuit of said second device, and a circuit connection from said meter to said resistance for causing the output current from said second device to flow through said resistance.

7. An alternating current meter comprising a space discharge device having an anode, a cathode and a control grid, a resistance common to the grid and anode circuits and connected in series with the cathode for applying biasing potential to the grid when current flows in the anode circuit, an output circuit for said device, an electric meter in the output circuit of said device, and a circuit connection from said meter to a point on said resistance intermediate the ends of said resistance for causing the alternating output current to flow through a portion of said resistance.

8. An alternating current meter comprising a space discharge device having an anode, a cathode and a control grid, a biasing resistance common to the grid and the anode circuits of said device, a second space discharge device, a direct current meter in the output circuit of said second device, and a rectifier in the output circuit for rectifying the alternating current output of the second device and supplying it to said meter, the output circuit including a connection to said biasing resistance for impressing the alternating output current on said resistance.

9. An alternating current meter comprising a space discharge device having an anode, a cathode, and a control grid, means for applying an initial negative potential to said grid, a resistance common to the grid and the anode circuits of said device, for applying an additional potential to said control grid when current flows in said anode circuit, a second space discharge device comprising an anode, a cathode and a control grid, an electric meter in the output of said second device, and a circuit connection from said meter to said resistance for causing the output current of said second device to flow through said resistance.

10. An alternating current meter comprising amplifying means, an input circuit and an output circuit for said means, a solid element type rectifier and a direct current meter in said output circuit, said output circuit including means connecting said rectifier and meter to said input circuit for feeding back alternating current to reduce the gain of said amplifying means.

11. An alternating current meter comprising an amplifier having an input circuit and an output circuit, and a rectifier and a current indicator device in said output circuit, said output circuit including means for connecting it to said input circuit for feeding back alternating current to reduce the gain of said amplifying means and to compensate for any tendency to electrical instability in said rectifier.

12. An electric metering device comprising amplifying means, an input circuit and an output circuit for said means, and an electric meter circuit in said output circuit, said output circuit including means connecting it to said input circuit for feeding back alternating current flowing through said meter circuit to reduce the gain of said amplifying means below what it would be if no feedback of any kind were present.

ALPHONS V. WURMSER.